United States Patent [19]

Martensson

[11] Patent Number: 5,998,964
[45] Date of Patent: Dec. 7, 1999

[54] PORTABLE APPLIANCE CHARGING SYSTEM

[75] Inventor: Nils Martensson, Chobham, United Kingdom

[73] Assignee: IPR Industries, Ltd., Farnborough Hants, United Kingdom

[21] Appl. No.: 09/042,998

[22] Filed: Mar. 17, 1998

[51] Int. Cl.$^6$ ...................................................... H02J 7/02
[52] U.S. Cl. ........................................... 320/111; 320/107
[58] Field of Search .................................... 320/111, 107, 320/114

[56] References Cited

U.S. PATENT DOCUMENTS

| 4,579,410 | 4/1986 | Soloman | 439/133 |
| 5,780,993 | 7/1998 | Tsang | 320/111 |

FOREIGN PATENT DOCUMENTS 2-261774  5/1993  United Kingdom .

Primary Examiner—Peter S. Wong
Assistant Examiner—Lawrence Luk
Attorney, Agent, or Firm—Oliff & Berridge, PLC

[57] ABSTRACT

The invention relates to a portable appliance charging system, comprising an adapter unit and a power supply unit, comprising means for coupling the power supply unit to an electrical device, and normal mains coupling means, current being supplied to the electrical device when the power supply unit is coupled to the mains power supply. The adapter unit comprises means for electrically coupling the adapter unit to the mains coupling means of the power supply unit, and adapter mains coupling means for electrically coupling the adapter unit to the mains power supply. The power supply unit and the adapter unit also comprise corresponding releasable connection means for physically securing said adapter unit to said power supply unit to ensure continuous electrical contact therebetween. Preferably, the adapter mains coupling means comprises an adapter pin arrangement which is a conventional pin arrangement specific to a is standard plug socket. Preferably, there are provided a number of interchangeable adapter units, together comprising a set of adapter units, each adapter unit having a pin arrangement corresponding to a different regional standard. The invention has the advantage of providing a charging system which can be used in a number of different countries or regions of the globe.

11 Claims, 8 Drawing Sheets

PORTABLE APPLIANCE CHARGING SYSTEM

FIELD OF THE INVENTION

The present invention relates to a portable appliance charging system, particularly, although not exclusively, for a cellular radio telephone.

BACKGROUND OF THE INVENTION

Commonly, portable cellular radio telephones are provided with removable batteries as their current source. Typically, these batteries are rechargeable Nickel-Cadmium (Ni—Cd) batteries.

To recharge the battery, the battery is left attached to the cellular radio telephone and is recharged in situ by means of a charging unit. In use, the charging unit is coupled to a mains alternating current supply via a conventional plug arrangement, for example, in the United Kingdom this is a conventional 3-pin plug arrangement well known to persons skilled in the art. The charging unit is coupled to the rechargeable battery by means of a multi-conductor cable which terminates, at its free end, in an electrical connector which is arranged to contact matching contacts on the telephone. The charging unit, typically, may be a simple transformer/current generator or switch mode supply. Such charging units are well known to persons skilled in the art. In use, the charging unit is plugged into the mains supply using the plug provided on the unit and the pin is plugged into the telephone. The rechargeable battery is left plugged into the charging unit until the battery is recharged.

The portable appliance charging units are usually supplied with the plug arrangement for the country in which the charging unit is sold. However, as is well known, different regions of the globe have adopted different mains plug and socket arrangements. For example, the United Kingdom, continental Europe, the USA, and Australia all have different arrangements. This is, of course, extremely inconvenient for the traveller, who must purchase an adapter to allow the unit to be used in the country to which that person is travelling. These adapters commonly do not always provide continuous coupling between the mains supply and the unit because the pins are held loosely in the adapter, which can lead to incomplete recharging—particularly so, when the device is left unattended.

A known power supply unit is supplied with a number of interchangeable plug adapter units, each with a different arrangement of pins. The plug adapter unit with the correct pin arrangement for use in a particular region is selected and then clipped onto the power supply unit to allow it to be plugged into the mains.

SUMMARY OF THE INVENTION

According to the present invention, there is provided a portable appliance charging system, comprising an adapter unit and a power supply unit, said power supply unit comprising a power supply unit housing, said housing having device coupling means for coupling the power supply unit to an electrical or electronic device, and normal mains coupling means, said normal mains coupling means being electrically coupled to the device coupling means, via transformer/constant current means, so that current is supplied to the electrical or electronic device when the power supply unit is coupled to the mains power supply, the adapter unit comprising an adapter housing, said adapter housing having adapter coupling means for coupling the adapter unit to the normal mains coupling means, and adapter mains coupling means for coupling the adapter unit to the mains power supply, said adapter mains coupling means being electrically coupled to the adapter coupling means, the adapter coupling means and the normal mains coupling means comprising electrical co-operating means such that there is continuous electrical coupling between the normal mains coupling means and the adapter coupling means, said adapter unit and said power supply unit also comprising corresponding releasable connection means for physically securing said adapter unit to said power supply unit.

The present invention has the advantage of providing a charging system which can be used in a number of different countries or regions of the globe, with a plug arrangement which is securely fixed to the housing of the power supply unit. Because one pin arrangement is permanently affixed to the power supply unit, there is no risk that electrical contacts coupled to the internal circuitry of the unit are revealed leading to the risk of electric shocks, and a secured pin arrangement ensures continuous coupling to the mains supply, thus providing reliable recharging. In addition, there are fewer extra pin arrangement units that need to be carried around while travelling.

BRIEF DESCRIPTION OF THE DRAWINGS

The invention will now be described, by example only, with reference to the accompanying drawings, of which.

DETAILED DESCRIPTION OF THE PREFERRED EMBODIMENTS

Figure 1:
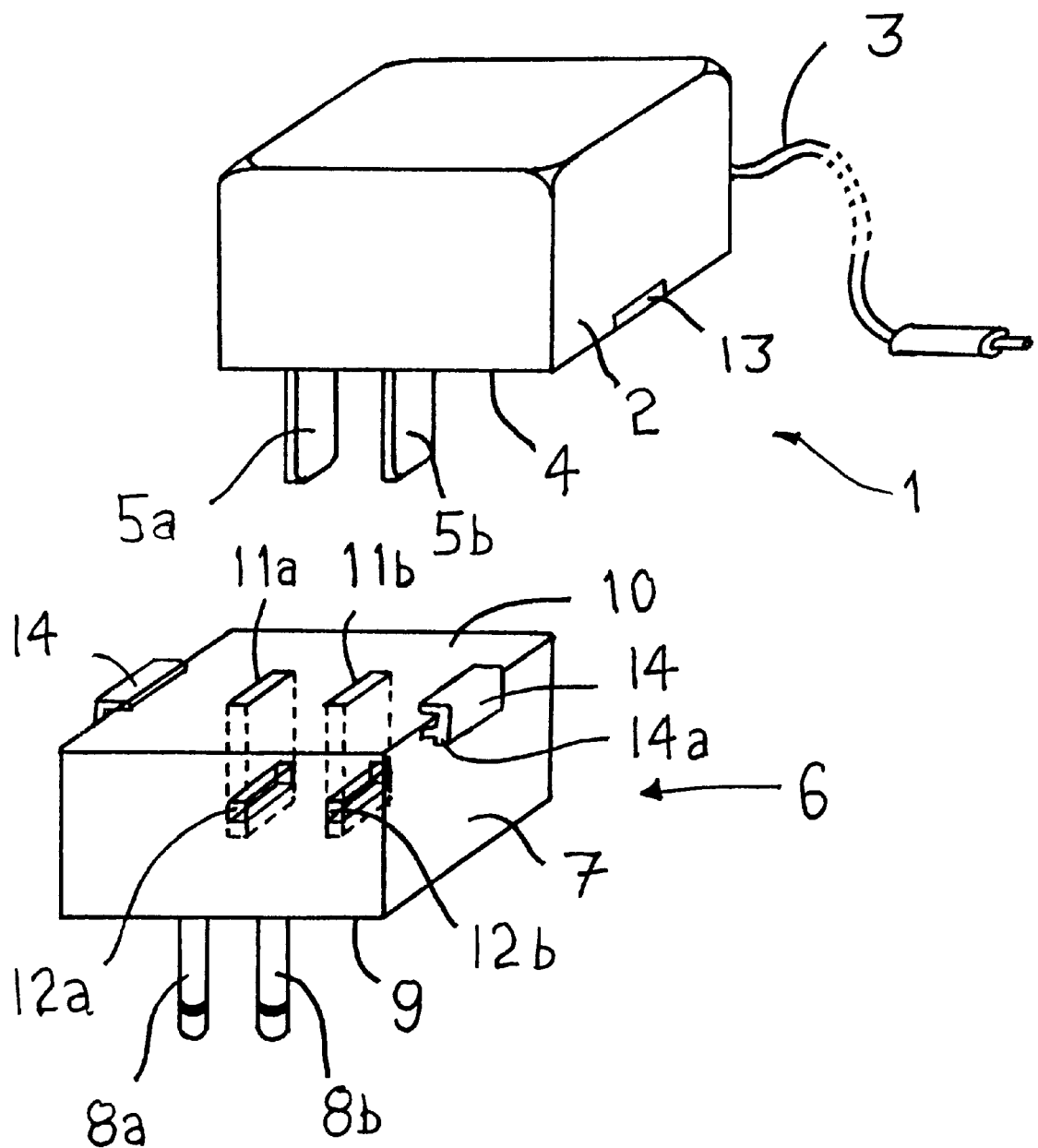
FIG. 1 is an exploded perspective view of a power supply unit and plug adapter unit.
Figure 2:
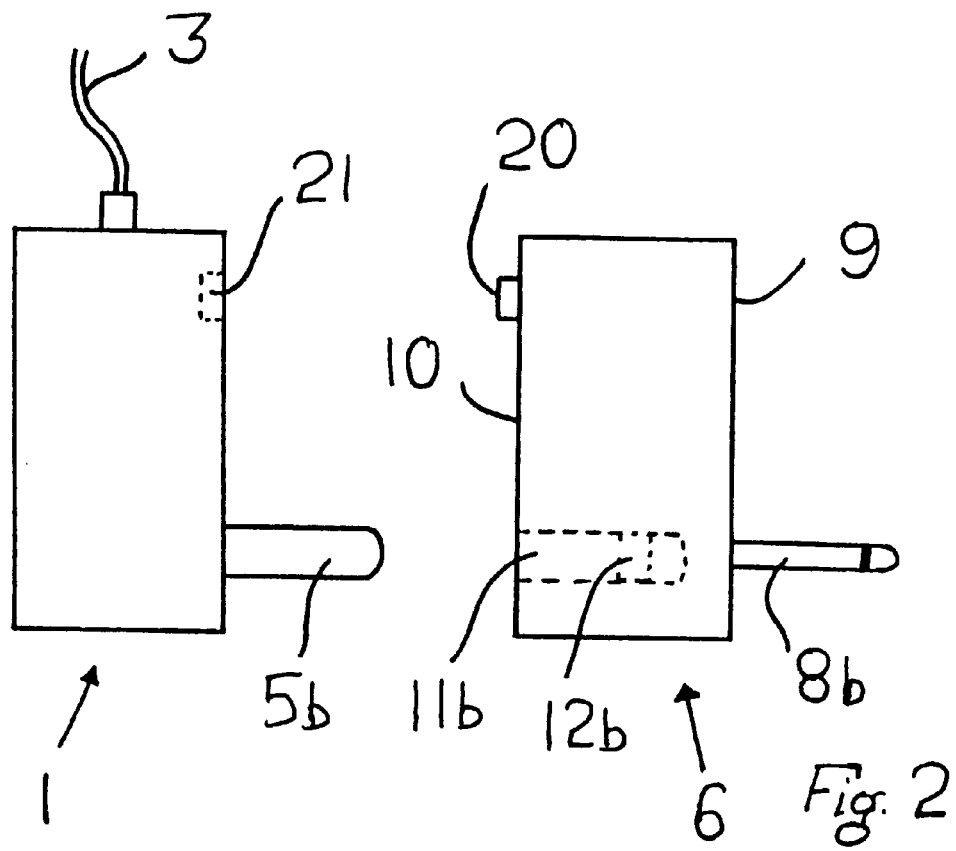
FIG. 2 is an exploded side view of a second embodiment of the invention.
Figure 3:
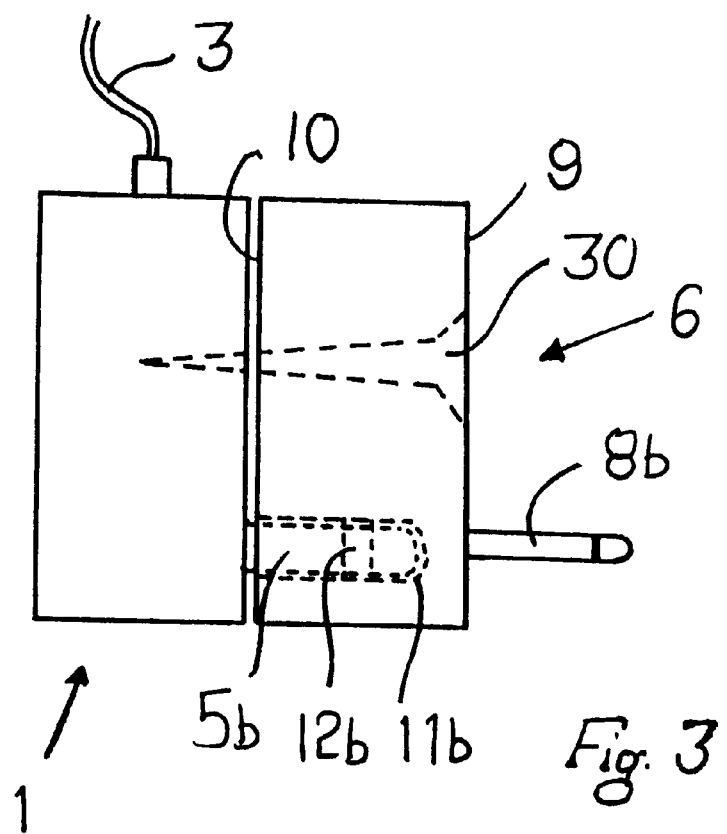
FIG. 3 is a side view of a third embodiment of the invention.

A portable appliance charging system comprises a power supply unit 1 comprising a housing 2, made of, for example a rigid plastics material. The housing 2 is used to house the transformer/constant current or switch mode power supply and associated circuitry and charging sensors as is well known to persons skilled in the art. The detailed composition and operation of such power supply units is not relevant to the present invention, and, as such, need not be described in any detail herein. A multi-conductor cable 3 is provided for coupling the charging unit to an electrical or electronic device such as a cellular radio telephone (not shown). In an alternative embodiment the device coupling means is arranged in a socket which mechanically supports the electronic or electrical device. On one of the faces 4 of the housing 2 is provided a pin arrangement for plugging into the mains supply. In the embodiment described herein, a two-flat pin arrangement conventional to the USA is illustrated, but, of course, any arrangement could be used. In use, these pins 5a, 5b would be plugged into a mains supply socket.

Should the user be in another part of the world where a different plug and socket convention operates, then a removable plug adapter unit 6 is provided to allow the power supply unit 1 to be coupled to the mains power supply.

The plug adapter unit 6 comprises a body 7 from one face 9 of which an arrangement of pins 8a, 8b projects. The plug arrangement conforms to the arrangement required in that particular country. In the embodiment described herein, a two-pin arrangement for use in continental Europe is illustrated.

In the parallel opposing face 10 there are provided a number of apertures 11a, 11b arranged to co-operate with the pins 5a, 5b on the housing of the charging unit 1. The internal surfaces of these apertures 11a, 11b are insulated around the entrance of these apertures 11a, 11b adjacent to the face 9 of the body 7, but are provided with respective electrical contact regions 12a, 12b. These contact regions 12a, 12b are electrically coupled to the adapter plug arrangement 8a, 8b in a known manner.

When it is needed to adapt the power supply unit 1 for use with another mains plug and socket convention, then the adapter unit 6 is plugged onto the power supply unit 1 by inserting the pins 5a, 5b into the co-operating apertures 11a, 11b until the pins 5a, 5b are snugly fitted the length of the apertures 11a, 11b. The plug adapter unit 6 is provided with resilient lugs 14 one on each opposing side of the body 7 designed to snap fit into co-operating grooves or recesses 13 provided on the housing 2 of the power supply unit 1. To remove the adapter body 7, an arm 14a of each lug 14 can be manually pressed so that the lugs bend at their fixation point to the adapter body 7, and the lugs 14 disengage from their respective grooves 13. In an alternative embodiment, a section of each groove is manually pressable to disengage the lugs from their respective grooves. When the pins 5a, 5b have been inserted into the apertures 11a, 11b, the pins contact with the contact regions 12a, 12b, and, thereby to the adapter pins 8a, 8b. The co-operation of the lugs 13 and grooves 14 ensure that the power supply unit 1 and the adapter unit 6 are securely held together so that when the lugs 13 and grooves 14 are engaged it is guaranteed that there is continuous electrical coupling between the pins 5a, 5b of the power supply unit 1 and the pins 8a, 8b of the adapter unit 6. The power supply unit 1 can then be plugged into the mains supply using the adapter pin arrangement 8a, 8b, and the mains supply will then be coupled to the power supply unit 1. The user therefore knows that the connection has been successfully made and the user is then free to leave the whole charging system until charging is complete. Also, the power supply unit 1 and the plug adapter unit 6 are prevented from any electrical separation during the duration of the charging process which might result from accidental contact caused, for example, by persons tripping over cables or accidentally knocking the charging system.

In a second embodiment of the invention, the power supply unit 1 and the adapter unit 6 are securely held together by one or more pairs of co-operating circular projections 20 and holes 21, in which the projections 20 are snap-fitted into a respective hole 21 to securely hold the power supply unit 1 and the adapter unit 6 together until such time as the power supply unit is no longer required.

In a third embodiment, the power supply unit 1 and the adapter unit 6 are held together by means of a screw 30.

Figure 4:
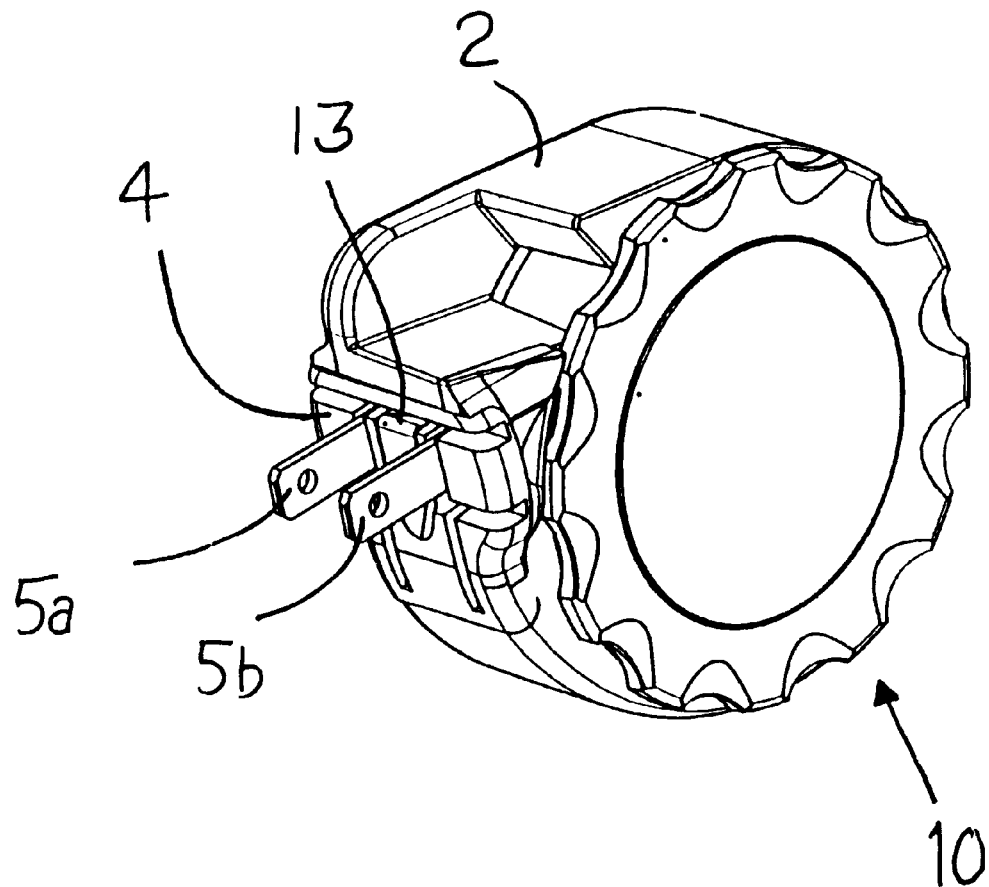
FIG. 4 shows a further embodiment of a power supply unit and plug adapter unit according to the present invention.
Figure 4:
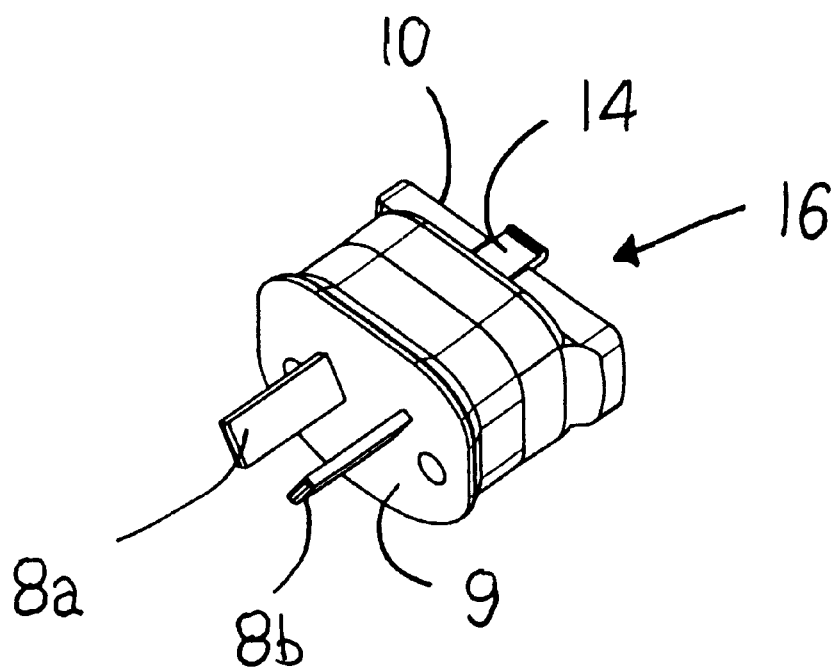
Figure 5:
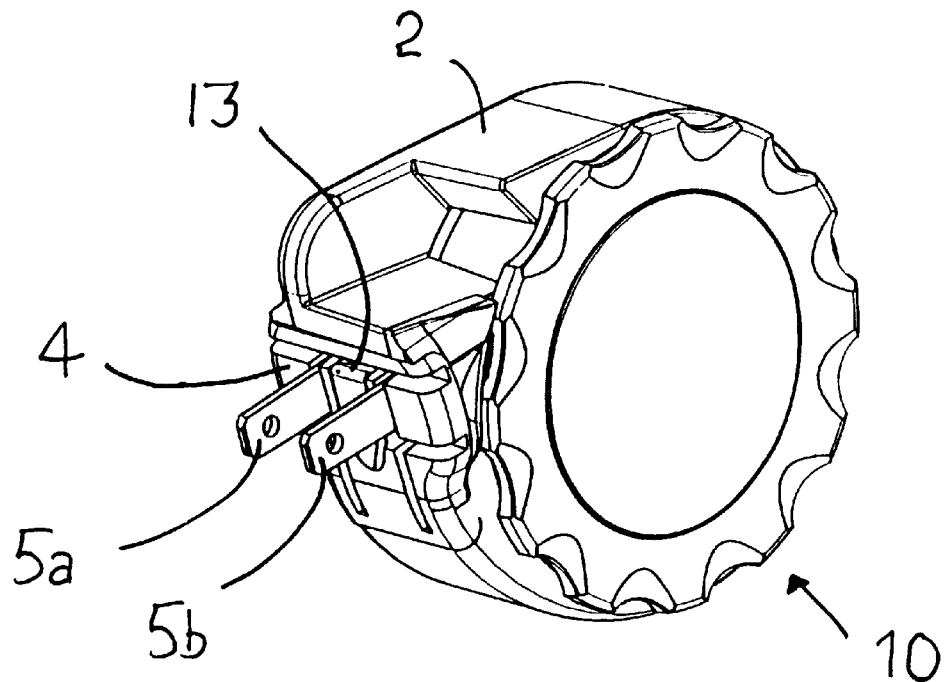
FIG. 5 shows a further embodiment of a power supply unit and plug adapter unit according to the present invention.
Figure 5:
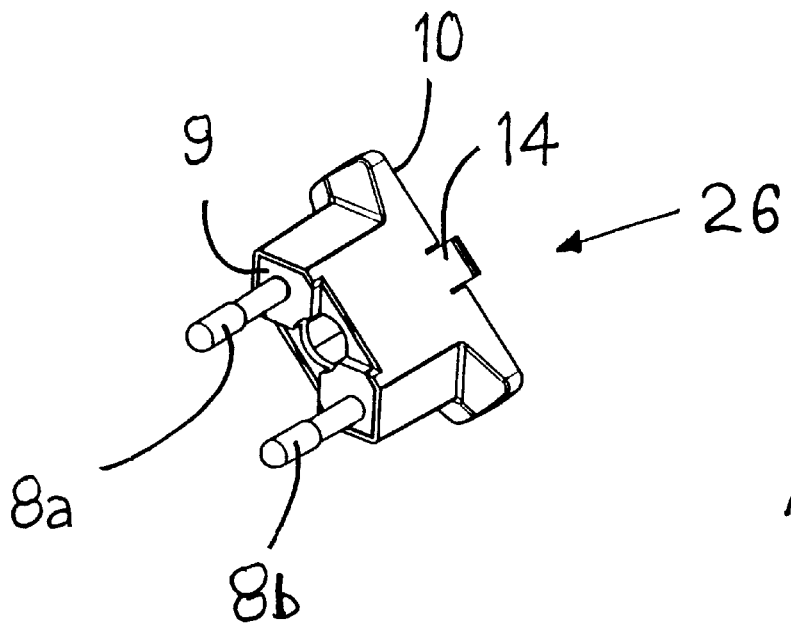
Figure 6:
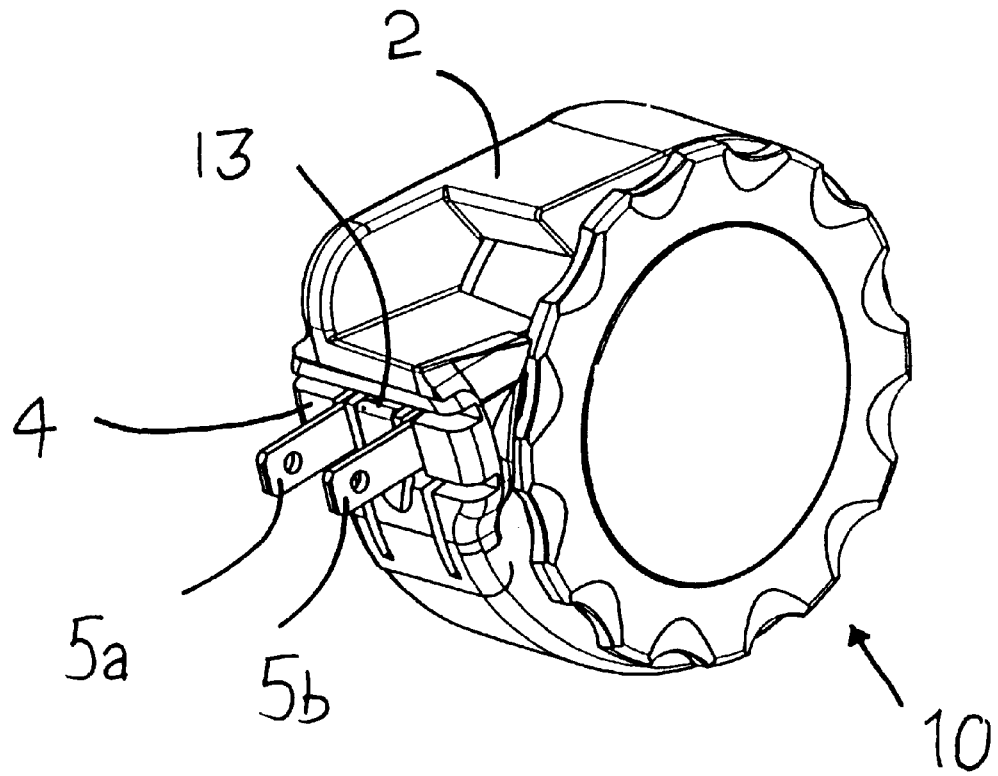
FIG. 6 shows a further embodiment of a power supply unit and plug adapter unit according to the present invention.
Figure 6:
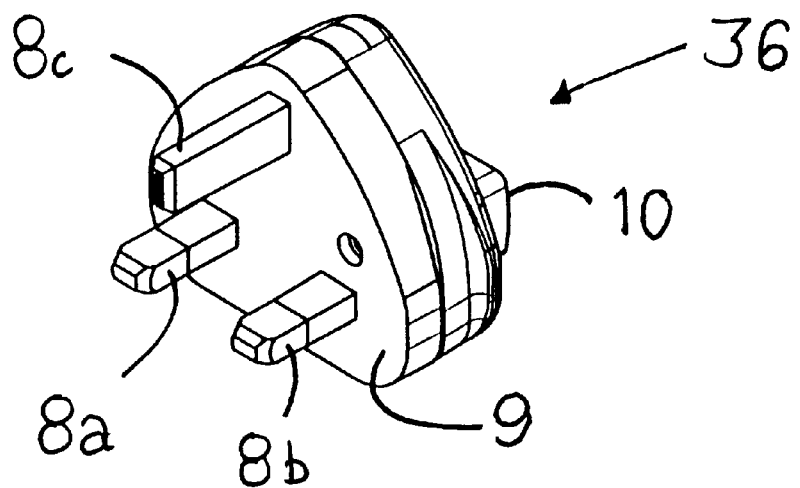

Three further embodiments of a power supply unit 10 and three different plug adapter units 16, 26, 36 are shown in FIGS. 4, 5 and 6. The power supply unit 10 is the same in each case, and the plug adapter units 16, 26, 36 are intended to be interchangeable, each plug adapter unit 16, 26, 36 having a different pin arrangement, and therefore being suitable for use in a different region. Corresponding parts to those in previous embodiments have the same numerical identifiers.

Figure 4A:
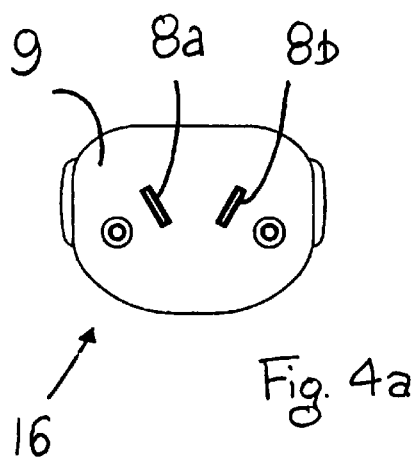
FIGS. 4a, 4b, 4c and 4d show front, rear and two side views respectively of the plug adapter unit of FIG. 4.
Figure 4B:
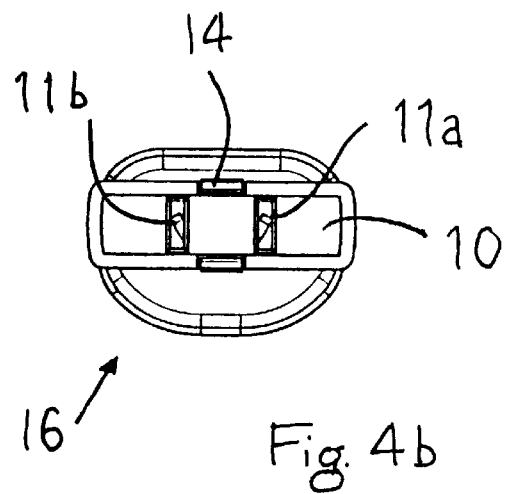
Figure 4C:
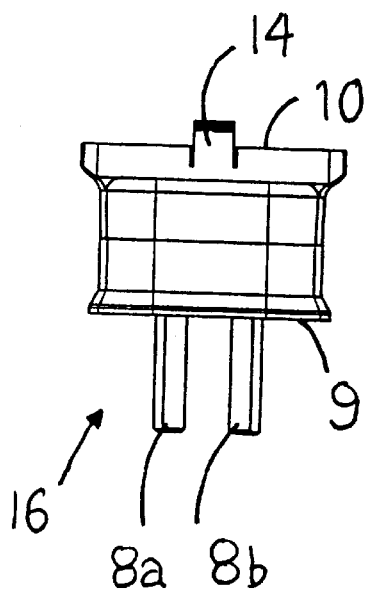
Figure 4D:
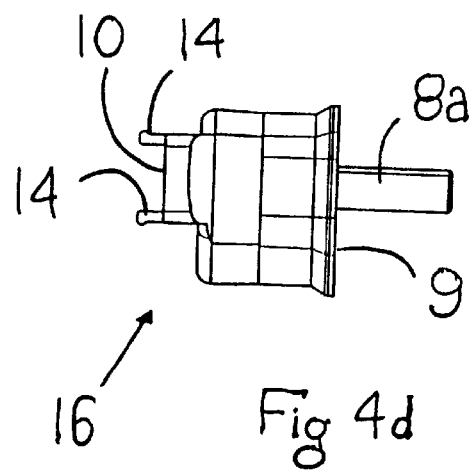
Figure 5A:
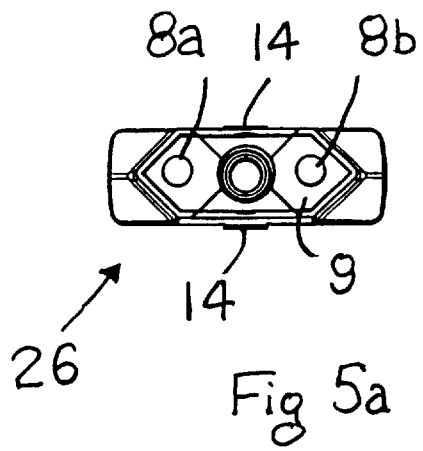
FIGS. 5a, 5b, 5c and 5d show front, rear and two side views respectively of the plug adapter unit of FIG. 5.
Figure 5B:
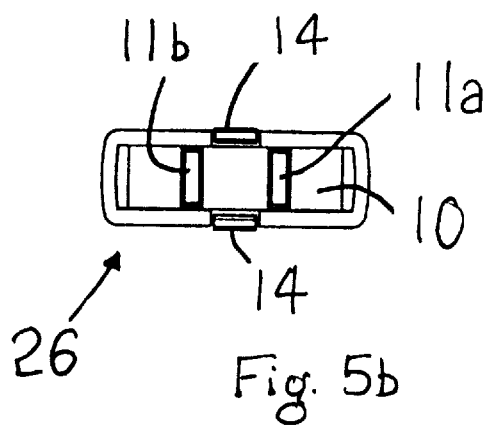
Figure 5C:
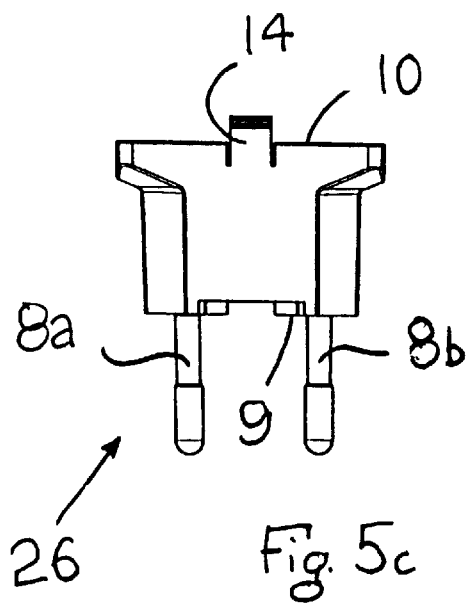
Figure 5D:
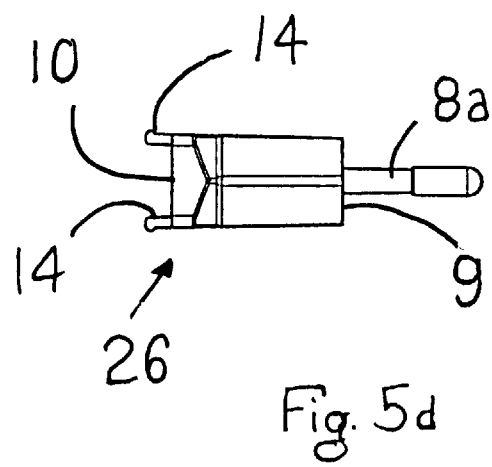
Figure 6A:
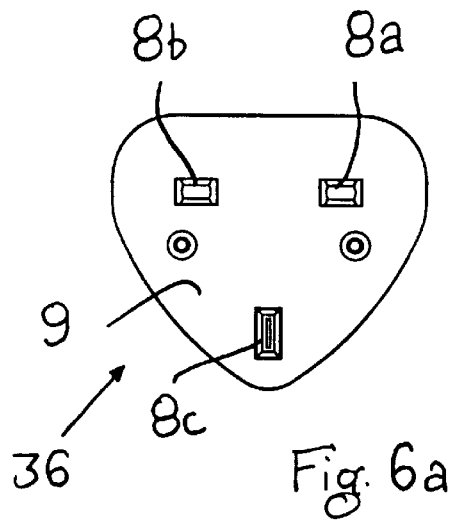
FIGS. 6a, 6b, 6c and 6d show front, rear and two side views respectively of the plug adapter unit of FIG. 6.
Figure 6B:
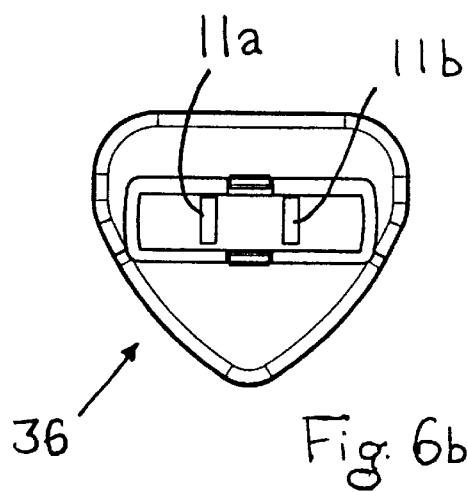
Figure 6C:
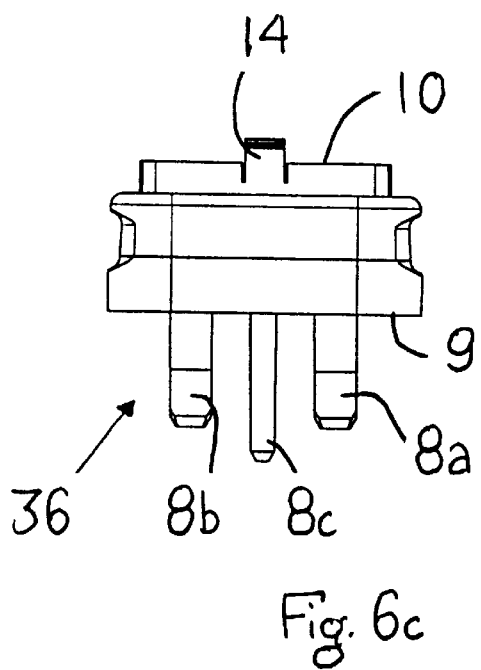
Figure 6D:
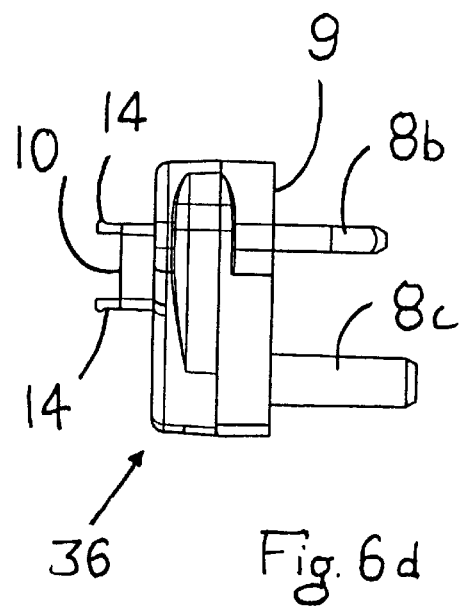

FIGS. 4a to 4d, 5a to 5d and 6a to 6d show views of the plug adapter units 16, 26, 36 of FIGS. 4, 5 and 6. FIGS. 4a, 5a and 6a are front views of each plug adapter unit showing the pin arrangements of each. Note that the plug adapter unit of FIG. 6 has an extra pin 8c. FIGS. 4b, 5b, 6b are rear views of each plug adapter unit, on which the apertures 11a, 11b for receiving the pins 5a, 5b of the charging unit 10 are visible, as are the lugs 14. FIGS. 4c, 5c, 6c and 4d, 5d, 6d are side views of each plug adapter unit.

The embodiments of FIGS. 4, 5 and 6 operate as described previously in relation to the first, second and third embodiments, and, as in the first embodiment, in each of the embodiments of FIGS. 4, 5 and 6, the plug adapter unit has lugs 14 which snap-fit into corresponding grooves 13 on the power supply unit 10 when the pins 5a, 5b of the charging unit 10 are fully inserted into their corresponding apertures 11a, 11b on the plug adapter units 16, 26, 36. To disengage the lugs 14 from their respective grooves 13, a user simply pulls the adapter unit away from the power supply unit with sufficient force to overcome the snap-fit mechanism. In an alternative embodiment the user is required to manually depress a section of each lug to disengage each lug from its corresponding groove. The lug and groove mechanism maintains the power supply unit 10 and the plug adapter unit 16, 26, 36 securely in co-operation, thus ensuring continuous full electrical contact between the two. Thus, the user need only carry a single adapter for the region of his/her destination, thereby reducing the weight and bulk required to be transported.

The power supply unit 10 and each of the plug adapter units 16, 26, 36 are small and light and the plug adapter units are designed to fit congruously onto the power supply unit 10. This reduces bulk, making the charging unit and adapter easy to pack for travellers, and the lightness of the power supply unit and adapter units reduces strain on the pins 8a, 8b of the plug adapter units when these are placed in a wall socket, and helps to prevent the power supply unit 10 from being dragged downwards under gravity.

As will be understood to a person skilled in the art, various modifications are possible within the scope of the present invention. For example, the power supply unit can have any pin arrangement as dictated by convention or need. Similarly the adapter pin arrangement and aperture arrangement and dimensions can be of any kind and combination as required. The shape of the adapter body can be of any shape suitable for the power supply unit. The power supply unit and the adapter unit can be securely held together so that there is continuous electrical coupling between the pins of the power supply unit and the pins of the adapter unit by any suitable means.

I claim:

1. A portable appliance charging system comprising a power supply unit and an adapter unit, the power supply unit comprising a normal mains pin connector coupled via transformer/constant current means to a device connector for coupling the power supply unit to an electrical or electronic device, and the adapter unit comprising an adapter socket connector for coupling the adapter unit to the normal mains pin connector, and, coupled thereto, an adapter mains pin connector for coupling the adapter unit to a modified mains socket power supply, the adapter unit including a manually releasable mechanical engagement means co-operating with engagement receiving means included in the power supply unit for automatically securing the adapter unit to the power supply unit, wherein the manually releasable mechanical engagement means further comprises slot means at least partially surrounding the pins of the power supply unit and flange means at least partially surrounding the adapter socket connector and engaging with said slot means when the adapter unit is being secured to the power supply unit.

2. The portable appliance charging system according to claim 1, wherein the adapter mains pin connector is permanently secured to the adapter unit.

3. The portable appliance charging system according to claim 1, wherein the adapter mains pin connector comprises an adapter pin arrangement which is a conventional pin arrangement specific to an existing plug socket.

4. The portable appliance charging system according to claim 1, wherein there are provided a number of interchangeable adapter units, together comprising a set of adapter units, each adapter unit having a pin arrangement corresponding to a different existing socket.

5. The portable appliance charging system according to claim 1, wherein the normal mains pin connector comprises an existing pin arrangement specific to a standard plug socket, and the adapter socket connector comprises an existing socket.

6. The portable appliance charging system according to claim 1, wherein the adapter socket connector is located on the opposite face of the adapter unit to the adapter pin connector.

7. The portable appliance charging system according to claim 1, wherein the manually releasable mechanical engagement means comprises at least one snap fit co-operating lug and groove arranged on the power supply unit and adapter unit.

8. The portable appliance charging system according to claim 7, wherein a section of said at least one snap fit co-operating lug may be manually pressed so that said lug is disengaged from its respective grooves, allowing uncoupling of the adapter unit and power supply unit.

9. The portable appliance charging system according to claim 7, wherein a section of said grooves may be manually pressed so that said at least one snap fit co-operating lug is disengaged from its respective grooves, allowing uncoupling of the adapter unit and the power supply unit.

10. The portable appliance charging system according to claim 7, wherein said at least one snap fit co-operating lug may be manually pulled in order to disengage it from its respective grooves, allowing uncoupling of the adapter unit and power supply unit.

11. The portable appliance charging system according to claim 7, wherein the manually releasable mechanical engagement means comprises at least one pair of snap-fitting co-operating circular projections and corresponding holes.

* * * * *